US011406916B2

(12) United States Patent
Parmentier

(10) Patent No.: US 11,406,916 B2
(45) Date of Patent: Aug. 9, 2022

(54) METHOD OF POWER-EFFICIENT CHROMATOGRAPHIC SEPARATION

(71) Applicant: Francois Parmentier, Saint-Martin-d'Hères (FR)

(72) Inventor: Francois Parmentier, Saint-Martin-d'Hères (FR)

( * ) Notice: Subject to any disclaimer, the term of this patent is extended or adjusted under 35 U.S.C. 154(b) by 714 days.

(21) Appl. No.: 16/086,122

(22) PCT Filed: Mar. 18, 2016

(86) PCT No.: PCT/FR2016/000053
§ 371 (c)(1),
(2) Date: Sep. 18, 2018

(87) PCT Pub. No.: WO2016/146905
PCT Pub. Date: Sep. 22, 2016

(65) Prior Publication Data
US 2020/0306666 A1 Oct. 1, 2020

(51) Int. Cl.
*B01D 15/24* (2006.01)
*B01D 15/18* (2006.01)
(Continued)

(52) U.S. Cl.
CPC ......... *B01D 15/247* (2013.01); *B01D 1/0047* (2013.01); *B01D 1/2853* (2013.01);
(Continued)

(58) Field of Classification Search
CPC ........ G01N 30/34; G01N 30/84; G01N 30/38; G01N 30/30; G01N 2030/8411;
(Continued)

(56) References Cited

U.S. PATENT DOCUMENTS 3,374,607 A * 3/1968 Fisher ................... B01J 20/281
95/87
3,390,513 A * 7/1968 Jentzsch ................ G01N 30/84
96/101
(Continued)

FOREIGN PATENT DOCUMENTS

DE 10124345 11/2002
EP 13338316 8/2003
(Continued)

OTHER PUBLICATIONS

International Search Report of PCT/FR2016/000053, dated Aug. 8, 2017.

*Primary Examiner* — Ryan B Huang
(74) *Attorney, Agent, or Firm* — Gearhart Law LLC; David Postolski, Esq.

(57) ABSTRACT

The invention is a method for liquid, gaseous or supercritical phase chromatography which involves circulating, on a chromatograph (6) containing a stationary phase, a load (1) comprising components to be separated entrained by a carrier fluid (2), said method being characterized in that it involves: (a) obtaining, at the outlet of the chromatograph, a plurality of chromatographic fractions (3, 4) comprising at least one component of the load and the carrier fluid in a first fluid phase, (b) imposing a change of state on at least one of said chromatographic fractions (3, 4) so as to obtain at least one fraction of purified carrier fluid in a second fluid phase different from the first fluid phase by separating said carrier fluid from the component of the load, (c) imposing a change of state in a reverse direction to that of step (b) on at least one fraction of purified carrier fluid obtained in step (b) so as to obtain at least one fraction of purified carrier fluid in a third fluid phase different to the second fluid phase, and in that it involves coupling the change-of-state energies from the first fluid phase to the second fluid phase and from the
(Continued)

second fluid phase to the third fluid phase of the same or of another fraction of purified carrier fluid, said coupling comprising a transfer of heat using a heat pump.

8 Claims, 3 Drawing Sheets

(51) Int. Cl.
    *B01D 15/40*     (2006.01)
    *B01D 53/02*     (2006.01)
    *G01N 30/34*     (2006.01)
    *G01N 30/84*     (2006.01)
    *B01D 5/00*     (2006.01)
    *B01D 1/28*     (2006.01)
    *B01D 1/00*     (2006.01)

(52) U.S. Cl.
    CPC .......... *B01D 1/2881* (2013.01); *B01D 5/0039* (2013.01); *B01D 5/0057* (2013.01); *B01D 15/1821* (2013.01); *B01D 15/1892* (2013.01); *B01D 15/24* (2013.01); *B01D 15/40* (2013.01); *B01D 53/025* (2013.01); *G01N 30/34* (2013.01); *G01N 30/84* (2013.01)

(58) Field of Classification Search
    CPC ... G01N 2030/3038; G01N 2030/3092; G01N 2030/025; B01D 5/0057; B01D 5/0039; B01D 53/02; B01D 53/04; B01D 53/0438; B01D 53/0407; B01D 1/28; B01D 1/2856; B01D 1/2881; B01D 1/2887; B01D 1/2815; B01D 1/2846; B01D 1/285; B01D 1/2853
    See application file for complete search history.

(56) References Cited

U.S. PATENT DOCUMENTS

| | | | | |
|---|---|---|---|---|
| 3,455,817 A | * | 7/1969 | Michael | G01N 30/28 210/640 |
| 4,230,464 A | * | 10/1980 | Bonmati | G01N 30/44 95/22 |
| 4,883,958 A | * | 11/1989 | Vestal | G01N 30/7273 250/288 |
| 4,982,097 A | * | 1/1991 | Slivon | H01J 49/0404 250/281 |
| 2010/0206812 A1 | * | 8/2010 | Woods | C10G 21/00 210/656 |
| 2020/0122054 A1 | * | 4/2020 | Stantchev | C10G 21/00 210/656 |

FOREIGN PATENT DOCUMENTS

| | | | | |
|---|---|---|---|---|
| FR | 1517537 | | 3/1968 | |
| FR | 2923405 | | 5/2009 | |
| FR | 2936177 | | 3/2010 | |
| GB | 890158 A | * | 2/1962 | ............ G01N 30/28 |
| JP | H05169288 | | 7/1993 | |

\* cited by examiner

METHOD OF POWER-EFFICIENT CHROMATOGRAPHIC SEPARATION

CROSS REFERENCE TO RELATED APPLICATION

This application is a national phase application of PCT Application No. PCT/FR2016/000053 filed on Mar. 18, 2016, the disclosure of which is incorporated herein by reference in its entirety.

FIELD OF THE INVENTION

The present invention is a reduced energy consumption separation process.

BACKGROUND OF THE INVENTION

Chromatography is a separation technique that allows powerful separation of compounds in a load under the effect of elution on contact with a stationary phase.

However, chromatography presents the drawback of greatly diluting the components of the load in a third substance, a liquid phase in liquid chromatography.

In preparative chromatography the separated compounds, or products, must be separated from this third substance and isolated during an extra step.

When the carrier fluid is a liquid, chromatograph effluent must be concentrated to recover the product. This generally requires the evaporation of large masses of very dilute solution, often at less than 1 mol %, or even less than 0.1 mol %.

The energy consumption is therefore very high.

The separation step is a key step for the method's viability.

Secondly, it is particularly interesting to perform preparative chromatography continuously and not sequentially.

In the prior art, simulated mobile bed devices are essentially used for this purpose. A displacement of a solid packing is simulated by sequencing it into a system of individual fixed beds, individual beds with limits from which the feed point and the points for drawing off the products are displaced. These devices are moderately effective and are de facto essentially discontinuous in their management. They are especially used in the liquid phase.

Continuous annular chromatography devices (abbreviated as CAC in this document) in which the separation is ensured continually by feeding while mixing to separate an upstream section from an annular rotating bed fed on this same face by an eluent.

The CAC device however represents an excellent solution principle for implementing continuous chromatography in so far as it allows spatial projection of the temporal sequence of any chromatogram.

U.S. Pat. No. 3,374,607A by Robert Fisher et al discloses a gas phase chromatography process in which the components of the load can be condensed simultaneously and then separated (col 3, l. 2-4 l. 20-23). This document does not disclose and does not call for a use of energy released by the condensation of fractions that can be condensed to provide energy to the process. Its energy consumption is high.

Patent application EP 1 338 316 A1 by Hamende et al discloses a liquid phase chromatography process for which a primary solvent vapor from the evaporation of a chromatographic fraction is used to feed the secondary solvent evaporator for another chromatographic fraction by indirect contact. The process requires that the primary vaporization be conducted at a higher temperature and pressure than the secondary vaporization. This indirect method does not allow the use for example of the vapor from the evaporation of a fraction to vaporize this same fraction, because no compression tool is used in the process described. Nothing discloses or evokes the use of a heat pump to achieve this energy coupling.

Patent application PCT/FR 11/000137 by Parmentier presents a packing for chromatography constituted of a monolithic multicapillary porous material comprising des capillary ducts substantially rectilinear and parallel to each other. It also describes continuous annular axial and radial chromatography devices using this packing.

BRIEF DESCRIPTION OF THE INVENTION

The invention is a liquid, gaseous, or supercritical chromatography process, wherein on a chromatograph (6) containing a stationary phase, a load (1) comprising components to be separated brought by a carrier fluid (2) are circulated, said process being characterized in that:

(a) at the exit of the chromatograph a plurality of chromatographic fractions (3, 4) is obtained comprising at least one component of the load and the carrier fluid in a first fluid phase, (b) a change of state is imposed in at least one of said chromatographic fractions (3, 4) so as to obtain at least one fraction of carrier fluid purified in a second different liquid phase of the first liquid phase by separating said carrier fluid from the component of the load, (c) a change of state the inverse of that of step (b) is imposed on at least one fraction of purified carrier fluid obtained in step (b) so as to obtain at least one fraction of purified carrier fluid in a third fluid phase different from the second fluid phase, and in that the change of state energies from the first fluid phase to the second fluid phase and from the second fluid phase to the third fluid phase from the same or another fraction of purified carrier fluid are coupled, said coupling comprising a heat transfer using a heat pump.

Specifically, the process is characterized in that the heat pump implements vapor recompression of the carrier fluid in a flow of said carrier fluid in the chromatography process.

Specifically, the process is characterized in that said heat pump implements vapor recompression of the refrigerant fluid different than the carrier fluid in a fluid flow outside the chromatography process.

Specifically, the process is characterized in that the first fluid phase is liquid, the second fluid phase is gaseous, and the third fluid phase is liquid, the plurality of chromatographic fractions (3, 4) obtained at the exit of the chromatograph comprising at least one component of the load and the carrier fluid in the liquid state, and in that:

in step (b), at least one of said chromatographic fractions is vaporized so as to obtain first said component of the load in concentrated liquid state and secondly the purified carrier fluid in the vapor state, in step (c), said purified carrier fluid obtained in step (b) is condensed, at least one part of the energy of the condensation of the vaporized carrier fluid is recovered and used to provide at least one part of the energy necessary to vaporize the carrier fluid of at least one chromatographic fraction.

Specifically, the process is characterized in that the first fluid phase is gaseous, the second fluid phase is liquid, and the third fluid phase is gaseous, the plurality of chromatographic fractions obtained at the exit of the chromatograph each comprising at least one component of the load and the carrier fluid in the gaseous state, and in that:

in step (b), at least one of said chromatographic fractions is condensed so as to separate a component of the load and the condensed carrier fluid, in step (c), the condensed carrier fluid obtained in step (b) is vaporized and said fluid is added in the gaseous state to the chromatograph, at least one part of the energy released by the condensation of said at least one chromatographic fraction is used to provide at least one part of the energy necessary for said vaporization of the condensed carrier fluid.

Specifically, the process is characterized in that the first fluid phase is in the supercritical state, the second fluid phase is liquid, and the third fluid phase is gaseous or supercritical, the plurality of chromatographic fractions obtained at the exit of the chromatograph each comprising at least one component of the load and the carrier fluid in the supercritical state, and in that:

in step (b), at least one of said chromatographic fractions is condensed so as to separate a component of the load and the condensed carrier fluid, in step (c), the condensed carrier fluid obtained in step (b) is vaporized and said fluid is added in the supercritical state to the chromatograph, at least one part of the energy released by the condensation of said at least one chromatographic fraction is used to provide at least one part of the energy necessary for said vaporization of the condensed carrier fluid.

Specifically, the process is characterized in that at least one component of the load and at least one part of the carrier fluid can be condensed simultaneously in substantially immiscible liquids that can be separated by decantation in the conditions of the process.

Specifically, the process is characterized in that the vapor recompression is conducted by an ejector whose motor fluid has a composition close to that of the fluid brought.

Specifically, the process is characterized in that the vapor recompression is conducted by mechanical vapor recompression.

Specifically, the process is characterized in that the compression is implemented by at least one compressor whose compression ratio is less than 3, preferably less than 1.5, and more preferably less than 1.15.

The invention is also a liquid, gas or supercritical phase chromatography system comprising a chromatograph (6) containing a stationary phase intended for the circulation of a load (1) comprising components to be separated brought by a carrier fluid (2) and to produce a plurality of chromatographic fractions comprising at least one component of the load and the carrier fluid in a first fluid phase, said system being characterized in that it comprises:

a suitable means of imposing a first change of state on at least one of said chromatographic fractions (3, 4) so as to purify the carrier fluid in a second different fluid phase of the first fluid phase by separating it from the component of the load, a suitable means of imposing on at least one fraction of purified carrier fluid a second change of state the inverse of the first so as to obtain a third fluid phase different from the second fluid phase, and a suitable heat pump for coupling the energies of the first and second change of state

DETAILED DESCRIPTION OF THE INVENTION

Figure 1:
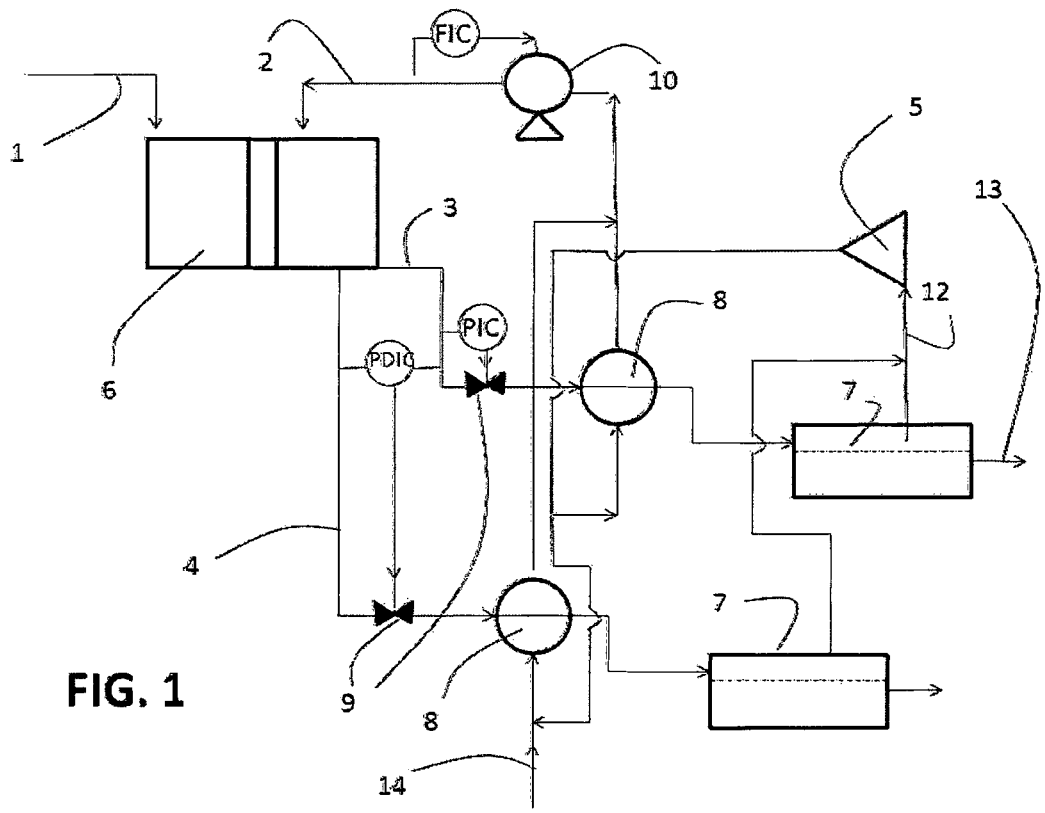
FIG. 1 is a drawing of a process according to the invention using a continuous liquid phase chromatograph.

In a chromatography process, the eluent fluid flow is generally predominant over the flow of load to separate, in terms of molar flow rate particularly.

The molar dilution of the molecule of interest in the eluent fluid may reach a factor 10, even a factor 100 or 1,000. The more difficult the separation, the greater the dilution will be.

Generally, it appears difficult to separate these dilute solutions effectively and at low cost.

Recovering the molecule of interest generally requires an extra concentration step, conducted by a membrane process for example, but more generally by a simple solvent evaporation in a liquid phase chromatography process.

The energy expenditure related to the vaporization of large masses of eluent liquid to concentrate the products from the separation from it is therefore high.

The invention is a liquid, gaseous, or supercritical chromatography process, wherein on a chromatograph containing a stationary phase, a load comprising components to be separated brought by a carrier fluid are circulated, said process being characterized in that:

(a) at the exit of the chromatograph a plurality of chromatographic fractions is obtained comprising at least one component of the load and the carrier fluid in a first fluid phase, (b) a change of state is imposed in at least one of said chromatographic fractions so as to obtain at least one fraction of carrier fluid purified in a second different liquid phase of the first liquid phase by separating said carrier fluid from the component of the load, (c) a change of state the inverse of that of step (b) is imposed on at least one fraction of purified carrier fluid obtained in step (b) so as to obtain at least one fraction of purified carrier fluid in a third fluid phase different from the second fluid phase, and in that the change of state energies from the first fluid phase to the second fluid phase and from the second fluid phase to the third fluid phase from the same or another fraction of purified carrier fluid are coupled, said coupling comprising a heat transfer using a heat pump.

This invention may in particular be achieved in three preferred ways:

Case 1/The first fluid phase is liquid, the second fluid phase is gaseous, and the third fluid phase is liquid.

The invention is then specifically a liquid chromatography process, wherein on a chromatograph containing a stationary phase, a load comprising components to be separated brought by a carrier fluid are circulated, said process being characterized in that:

at the exit of the chromatograph a plurality of chromatographic fractions is obtained comprising at least one component of the load and the carrier fluid in a liquid state, at least one of said chromatographic fractions is vaporized so as to concentrate at least one component of the load in liquid state and to obtain the purified carrier fluid
in the vapor state,
the gaseous carrier fluid is condensed
the condensation energy contained in the vaporized carrier fluid is recovered during its condensation and used to directly or indirectly provide the energy necessary for the vaporization of at least one chromatographic fraction by a heat pump loop.

Case 2/The first fluid phase is gaseous, the second fluid phase is liquid, and the third fluid phase is gaseous.

The invention is also specifically a gas chromatography process, wherein on a chromatograph containing a stationary phase, a load comprising components to be separated brought by a gaseous carrier fluid are circulated, the carrier fluid being able to be condensed in a liquid in the conditions of the process, said process being characterized in that:

at the exit of the chromatograph a plurality of chromatographic fractions is obtained each comprising at least one component of the load and the carrier fluid
in the gaseous state,
at least one of said chromatographic fractions is condensed so as to separate a component of the load and the condensed carrier fluid,
the condensed carrier fluid is vaporized and said fluid is added in the gaseous state to the chromatograph,
the energy released by the condensation of said at least one chromatographic fraction is used to provide directly or indirectly the energy necessary for said vaporization of the condensed carrier fluid.

Case 3/The first fluid phase is supercritical, the second fluid phase is liquid, and the third fluid phase is gaseous or supercritical.

The invention is also specifically a supercritical chromatography process, wherein on a chromatograph containing a stationary phase, a load comprising components to be separated brought by a supercritical state carrier fluid are circulated, the carrier fluid being able to be condensed in a liquid in the conditions of the process, said process being characterized in that:

at the exit of the chromatograph a plurality of chromatographic fractions is obtained each comprising at least one component of the load and the carrier fluid in a supercritical state, at least one of said chromatographic fractions is condensed so as to separate a component of the load and the condensed carrier fluid, the condensed carrier fluid is vaporized and said fluid is added in the supercritical state to the chromatograph, the energy released by the condensation of said at least one chromatographic fraction is used to provide directly or indirectly the energy necessary
for said vaporization of the condensed carrier fluid.

Heat pump is understood to be a method of transferring heat energy from a cold source towards a hot source.

Among others, these qualified heat pump systems can be cited:
Vapor recompression machines (or usual heat pumps)
Gas absorption heat pumps
Peltier effect heat pumps
Gas compression or Stirling cold heat pumps
Thermoacoustic heat pumps
Heat pumps using thermomagnetic heat Specifically, this heat transfer occurs by means of a fluid called a refrigerant in liquid state under low pressure, made to boil by contact with a cold heat source, and condensed under higher pressure on contact with a hot heat sink. The process's motor is a recompression of the vapor from the refrigerant fluid between vaporization and condensation.

Accordingly, the condensation and vaporization of the carrier fluid are coupled thermally.

The compression will advantageously be conducted by mechanical vapor compression. This is understood as a means of increasing the pressure of a gaseous fluid by a mechanical action, such as for instance a rotating compressor, alternative, an axial pressure booster, one or more ventilators, an ejector.

Advantageously this process according to the invention is characterized in that the vapor is compressed by an ejector operating with the gaseous refrigerant fluid under pressure as a motor fluid. Accordingly, the result is a particularly simple and inexpensive investment.

The term chromatographic fraction means the distinct fractions containing the various components of the load separated and the eluted carrier fluid, fractions taken from the carrier fluid at the exit of the chromatograph.

According to an embodiment of the invention, the heat transfer from the cold source to the hot source is conducted using compression conducted on the carrier fluid of the chromatographic process in the gaseous state. Advantageously, this operation is conducted in a recycling loop for the flow of carrier fluid in the chromatography process, i.e. on the process flows internal to the chromatography process flow.

The multiplicity of chromatographic fractions from the process makes managing the vapor flow collected delicate and difficult at different points of the process, obtained at different pressures and temperatures, and feeding a multiplicity of associated separators and heat exchangers. Powerful energy optimization from a network constituted of a multiplicity of coupled reboilers and condensers can become unstable and difficult to conduct, when the refrigerant fluid loop is connected and communicates directly with the process loop via a material flow.

Secondly the carrier fluid used for the chromatographic separation has no reason to constitute a thermodynamically effective and easy to compress refrigerant fluid of choice other than coincidentally. Specifically, the electric energy that the compressor provides can be minimized by a careful choice of coolant and refrigerant fluid, causing a worthy and expensive energy economy and lower investments.

The carrier fluid is generally inflammable, often toxic, thermally unstable and corrosive. Mixtures of elution solvents are frequent in chromatography; these mixtures do not behave like pure fluids, and boil in a temperature range corresponding to variable compositions. This is an extra difficulty for their direct use as refrigerant fluid and makes compressors and exchangers very big.

Finally traces of solutes originating from the residual load in the gaseous carrier fluid may disrupt the process, due to their accumulation in condensers (eventual solid formation, liquid-liquid separation), or their thermal decomposition, by the risk of corrosion that it may represent, etc.

Advantageously, the coupling can therefore be achieved by a different refrigerant fluid than the carrier fluid in a fluid loop outside the chromatography process flow. Accordingly, process complexity is limited, the choice of refrigerant fluid that can be chosen is retained optimally for its thermodynamic qualities and for its optimal characteristics in terms of stability, toxicity and inflammability.

According to the invention this heat exchange is conducted so as to reduce the heat energy consumption by the process.

Note that the great dilution of chromatographic fractions inherent to chromatography means that the boiling and condensation points of the pure carrier fluid and the carrier fluid containing a low concentration of compound of the load from the chromatograph are very close. The difference can be of the order of a few degrees or even less than 1 degree centigrade. This particularity makes the method of energy optimization including mechanical vapor recompression or MVR extremely powerful for chromatography.

So a heat pump can work with a very low temperature difference between the cold area and the hot area, and therefore with very low compression rates.

Accordingly, excellent energy performances can be obtained, better than those of a ten-effect or forty-effect evaporator, or a one hundred-effect evaporator, for example, and to make the chromatographic separation inexpensive in terms of operating costs.

The molar concentration of concentrated fluid delivered at the exit of the process could for example reach between a few % and a few tens of percent % of product originating from the load.

In particular it may be comprised between 1 mol % and 70 mol % of product originating from the load. In particular it may be comprised between 3 mol % and 30 mol % of product originating from the load. Preferably it may be comprised between 5 mol % and 15 mol % of product originating from the load.

Accordingly, a considerable energy saving is obtained.

The vapor pressure of the carrier fluid above a concentrated solution of it can be approximated by Raoult's Law. A 70% dilution generally means a vapor pressure close to 70% of that of said pure fluid. The compression rate of the compressor will therefore be low.

Advantageously, the compressions ratios of the compressor(s) are less than 3, preferably less than 1.5, and even more preferably less than 1.15.

Advantageously a single compression stage is sufficient.

Now the conditions for conducting case 1 will be examined more precisely.

Advantageously the condensation energy of the carrier fluid evaporated originating from the concentration of a specific chromatographic fraction is used to evaporate the carrier fluid of said dilute fraction.

Indeed the thermal loads equalize, and an operation variation is automatically compensated for.

Using said vaporization, the energy transfer leads to the separation of a concentrated phase into at least one compound of the load and a purified carrier fluid.

According to the invention this heat exchange is conducted so as to reduce the heat energy consumption by the process. It is understood that the energy necessary to heat up or vaporize a chromatographic fraction in the liquid state is sampled from the carrier fluid in its return path to the chromatograph, or that the energy produced during cooling or condensation of a chromatographic fraction in the vapor state is transferred in its return path towards the chromatograph to the originating carrier fluid.

Accordingly the need for heat energy inherent to reheating or vaporizing the chromatographic fraction is reduced by such a coupling, by recovering this energy in a flow or it is accessible.

According to the invention, this heat exchange leads to better separation of the component(s) of the load present in the chromatographic fraction jointly with purification of the carrier fluid.

Carrier fluid feeding the chromatograph is understood in particular to mean the carrier fluid purified at various degrees in the loop of the process feeding the chromatograph.

The change of phase between a liquid and a vapor is both a very energy consuming phenomenon and widely used in purification techniques for molecules.

In particular the carrier fluid can be in a liquid state close to the critical point in the chromatograph.

It is known indeed that around the critical point the latent heats of vaporization are very low.

It is accordingly possible to produce very pure effluents at low energy cost.

Preferably, this energy coupling is conducted by mechanical vapor recompression (or MVR) conducted around the loop of carrier fluid so as to improve the energy efficacy of the process.

Advantageously this MVR couples the energy necessary for the vaporization of one of more chromatographic fractions and the energy released by the recondensation of the gaseous carrier fluid.

Mechanical vapor recompression may particularly be conducted either directly on the vaporized carrier fluid by recompressing it, or indirectly using an auxiliary heat pump.

The process consists specifically in totally or partially vaporizing the flow of carrier fluid and product from the chromatograph into an evaporator involving the condensation of a refrigerant fluid under pressure, gives up its heat energy to the carrier fluid. This refrigerant can in particular feed the second side of an indirect contact heat exchanger. Since the heat transfer coefficients for condensation and evaporation are excellent, the necessary exchange surface area will be low, and the evaporator will be compact and inexpensive.

The liquid refrigerant fluid produced by the previous step is evaporated in a reboiler under a lower pressure than the pressure in the evaporator condensing the gaseous carrier fluid. The liquid carrier fluid after condensation optionally returns to feed the chromatograph.

The refrigerant fluid can be constituted by the carrier fluid itself. In particular the vaporized carrier fluid separated from the molecules of the load is condensed under pressure in the exchangers serving to vaporize the chromatographic fractions from the chromatograph, is condensed, and feeds the chromatograph with pure carrier liquid.

With such a scheme, very powerful recovery and recycling can be operated for the carrier fluid, which will circulate in the closed loop process.

Advantageously all the liquid fractions of the carrier liquid from the chromatograph are evaporated under the action of a single compressor in the process.

Advantageously according to the invention the liquid carrier phase is purified at the exit of the chromatograph by distillation in a distillation column so as to recover the load at the base of the column and the pure carrier fluid at the head of the column, where the energy necessary for vaporizing the liquid at the foot of the column and the energy produced by condensing the vaporized carrier fluid at the head of the column are coupled by mechanical vapor recompression.

This MVR will be conducted on the process flow, or on a distinct flow by a heat pump working with a different refrigerant fluid from the eluent phase.

Advantageously this coupling is achieved by a fluid outside the chromatography process flow.

Advantageously, components from the load separate in the liquid state from the concentrated carrier liquid in the process conditions.

Advantageously in this case they are separated by decantation.

To the process a simple purification step can be added for the carrier fluid vaporized and recondensed after recovery or energy coupling with the chromatographic fractions such as a vapor removal, a distillation, a liquid-liquid extraction, a flash, a decantation, a membrane separation (such as pervaporation, reverse osmose, nanofiltration), etc.

To the process a simple purification step can be added for the carrier fluid vaporized such as a distillation, a gas-liquid extraction, etc.

In particular when this purification will be made by distillation by the vapor of the liquid carrier fluid, the necessary vapor can be produced by recovering the power given up to the carrier fluid or to the refrigerant fluid vaporized by the compressor. This translates to overheating and therefore appreciable heat that may be recovered to evaporate from the carrier fluid in liquid form.

According to a variant of this process, a MVR heat pump cycle can be realized around this distillation column. Advantageously this loop around the column and the carrier fluid loop around the chromatograph will use the same compressor.

Advantageously components of the load from the chromatograph can be condensed into solids in a concentrated liquid carrier fluid by evaporation in the process conditions.

Advantageously these solids are separated by extraction in a solvent that is immiscible with the liquid carrier fluid.

Advantageously this solvent is added to the mixture upstream of the level or at the level of the vaporization of the carrier fluid from the chromatograph.

To the process a simple purification step can be added for the load condensed and separated such as a distillation, a vapor distillation, a liquid-liquid extraction, a flash, a crystallization, a membrane separation (pervaporation, osmose inverse, etc.) to separate it from the last traces of carrier fluid.

These traces of carrier fluid will advantageously be recovered and recycled.

The process loop for the carrier fluid can operate at any pressure required by the requirements of the process, and particularly around the critical point.

It is known indeed that around the critical point the latent heats of vaporization are very low.

In particular components from the load that are very dilute chromatographic fractions can be treated in this way.

The separation of a component of the load and the carrier fluid can be facilitated if the difference in boiling point between these two substances is large.

It will advantageously be greater than 40° C. in particular.

The separation of the load and the carrier fluid can be facilitated if it is constituted of carbon-based molecules. In particular this may be an organic solvent.

Advantageously a molecule of the carrier fluid includes a carbon backbone and one or more atoms chosen from chlorine, hydrogen, and fluorine, in any combination.

In particular this may be a mixture of organic solvents or organic solvents and other volatile substances.

In particular this may be a mixture of mainly non-polar or only slightly polar substances and minor polar modifiers.

In particular this may be a mixture of mainly polar substances and minor non-polar modifiers.

These mixtures are well known in the state of the art.

Among the polar substances or polar modifiers, water, short chain alcohols, light nitriles, light ethers, chloroform, etc., can be cited.

Among the non-polar or only slightly polar modifiers aliphatic and aromatic hydrocarbons, halocarbons such as Freons, etc., can be cited.

Such a process according to any of its variants will be even more effective when the loss of load in the process and in particular through the chromatograph that is the first cause is low.

Advantageously the loss of load of the liquid eluent carrier fluid in the chromatograph is less than 20 bar, preferably less than 5 bar, and even more preferably less than 2 bar.

According to a preferred embodiment of the invention, the packing selected for use in the chromatograph will include in its mass empty passages or macropores that provide little resistance to the flow of a fluid and allowing close contact with a stationary phase.

Empty passages are understood to mean connected passages devoid of liquid or solid material that can form an obstacle to the passage of the carrier gas and generate loss of load.

These may preferably be pores, crevices or substantially rectilinear channels.

These may be pores such as those present in a woven or nonwoven material or any other type of fibrous structure.

Advantageously the size of these pores or channels will be greater than 5 µm, and preferably greater than 50 µm.

Advantageously this packing includes a multicapillary packing, which presents a very low loss of load.

Multicapillary packing is a packing with a multiplicity of contiguous empty, rectilinear, parallel, homogeneous and regular channels, that lead out of the packing on both sides.

Note that a preferred feature of the invention consists in combining and selecting a multicapillary packing and an annular continuous chromatograph to conduct the chromatographic separation, and of a vaporizable liquid carrier fluid coupled with an energy optimization by mechanical vapor recompression around the vaporization of the carrier fluid. This selection produces a highly effective continuous chromatographic process with low energy cost.

Preferably a chromatograph or an arrangement of chromatographic columns that allows a quasi-continuous flow of carrier fluid will be used.

A simulated mobile bed can be used.

Advantageously a continuous annular chromatograph will be used, either axial i.e. whose flow follows the axis of the chromatograph, or radial, i.e. whose flow is radial in the chromatography device.

Now the conditions for conducting case 2 will be examined more precisely.

Preferably, in this case this energy coupling is conducted by mechanical vapor recompression (or MVR) conducted on the gaseous loop of carrier fluid so as to improve the energy efficacy of the process.

Mechanical vapor recompression may particularly be conducted either directly on the carrier fluid by recompressing it, or indirectly using an auxiliary heat pump.

Such a process according to any of its variants will be even more effective when the loss of load in the process and in particular through the chromatograph that is the first cause is low.

Advantageously the loss of load of the eluent gas in the chromatograph is less than 2 bar, preferably less than 0.5 bar, and even more preferably less than 0.2 bar.

Specifically the carrier fluid can be in a gaseous state similar to the critical conditions in the chromatograph.

In particular the carrier fluid can be in a state close to the critical point when it is vaporized.

Close to the critical point is understood to mean an area comprised simultaneously between 0.8 and 1.2 times the critical pressure, and between 0.8 and 1.2 times the critical temperature.

Close to the critical point is understood more particularly to mean an area comprised simultaneously between 0.9 and 1.1 times the critical pressure, and between 0.9 and 1.1 times the critical temperature.

It is known indeed that around the critical point the latent heats of vaporization are very low.

It is known secondly that the productivity of the chromatograph increases by increasing its working pressure, and particularly around the critical point.

It is also known that the compression of a fluid will be even more economical and easy when the compression rate required is lower, and when its density is high.

Therefore, by operating the process around the critical domain, it will be possible to condense and evaporate the carrier fluid under the effect of transfer of moderated powers at a condensation exchanger for the carrier fluid, to compress dense fluids under low compression rates, to reduce the size and cost of the installation, and to improve its energy performance.

In particular components from the load that are very dilute chromatographic fractions can be treated in this way.

According to a preferred embodiment of the invention, the packing selected for use in the chromatograph will include in its mass empty passages or macropores that provide little resistance to the flow of a fluid and allowing close contact with a stationary phase.

Empty passages are understood to mean connected passages devoid of liquid or solid material that can form an obstacle to the passage of the carrier gas and generate loss of load.

These may preferably be pores, crevices or substantially rectilinear channels.

These may be pores such as those present in a woven or nonwoven material or any other type of fibrous structure.

Advantageously the size of these pores or channels will be greater than 5 µm, and preferably greater than 50 µm. Advantageously this packing includes a multicapillary packing, which presents a very low loss of load. Indeed the quantity of energy necessary for mechanical vapor compression is considerably reduced by reducing the pressure differences required on the hot and cold side of a heat exchanger serving to recover the vaporization energy of the carrier fluid. The multicapillary packing is therefore exceptionally able to achieve this process that makes it the preferable selection.

As previously, multicapillary packing is a packing with a multiplicity of contiguous empty, rectilinear, parallel, homogeneous and regular channels, that lead out of the packing on both sides.

Preferably a chromatograph or an arrangement of chromatographic columns that allows a quasi-continuous flow of carrier fluid will be used.

A simulated mobile bed can be used.

Advantageously a continuous annular chromatograph will be used, either axial i.e. whose flow follows the axis of the chromatograph, or radial, i.e. whose flow is radial in the chromatography device.

Advantageously components of the load from the chromatograph can be condensed into solids with the condensed carrier fluid in the process conditions.

Advantageously these solids are separated by extraction in a solvent that is immiscible with the condensed carrier fluid.

Advantageously this solvent is added to the mixture upstream of the level or at the level of the condensation of the carrier fluid from the chromatograph.

In particular they can be added to a heat exchanger to prevent it from being soiled by crystallization or depositing solid on the surface of the heat exchange.

Advantageously this solvent is added in the gaseous state to the mixture downstream of the condensation of the carrier fluid from the chromatograph before or after a mechanical vapor recompression compressor.

In this way the solvent serves to change the eluent characteristics of the carrier fluid in the chromatograph.

Advantageously the process according to the invention is characterized in that components of the load cannot be condensed in the process conditions.

Advantageously in this case they are separated by decantation.

Advantageously, components from the load can be condensed in the liquid state in the process conditions.

The invention consists in particular of using as a carrier fluid for a preparative chromatograph a vapor that can be condensed and is immiscible in the liquid state with the separated products of the load, combined with energy coupling between the condensation of the load and the evaporation of the carrier fluid from its liquid state to improve the economy and the energy performances of the process while offering great simplicity of use. Preferably, this coupling is conducted by mechanical vapor recompression conducted around the carrier fluid so as to improve the energy efficacy of the process.

Mechanical vapor recompression may particularly be conducted either directly on the carrier gas by recompressing it, or indirectly using an auxiliary heat pump, working with a fluid distinct from the eluent fluid.

The process consists therefore in totally or partially condensing the flow of carrier gas and product from the chromatograph by involving the evaporation of a refrigerant fluid. This can in particular feed the second side of an indirect contact heat exchanger. Since the heat transfer coefficients for condensation and evaporation are excellent, the necessary exchange surface area will be low and the exchanger will be compact and inexpensive.

A refrigerant fluid is recompressed and serves to evaporate the condensed and separated carrier fluid from the previous step, which returns to feed the chromatograph.

The refrigerant fluid can be constituted by the carrier fluid itself, which limits the necessary investments. In particular the gaseous carrier fluid condensed and separated from the molecules of the load is evaporated under pressure in the exchangers serving to vaporize the chromatographic fractions from the chromatograph, is recompressed, and feeds the chromatograph with pure carrier gas.

Excellent energy performances can be obtained, better than those of a ten-effect or forty-effect evaporator for example, and to make the chromatographic separation inexpensive in terms of operating costs and investments.

Accordingly, a considerable energy saving is obtained.

Advantageously all the fractions of the carrier gas condensed and optionally purified are evaporated under the action of a single compressor in the process.

The separation of the load and the carrier gas can be facilitated if it is constituted of carbon-based molecules.

In particular this may be a mixture of carbon molecules whose scope is in applications of refrigerant cycles, such as Freons (from DuPont de Nemours), including one or more atoms chosen from chlorine, hydrogen, fluorine, in any combination.

According to a preferred embodiment of the invention, described below, compounds from the load and the carrier fluid are immiscible when condensed and are liquids from the condensation step of the carrier fluid at the exit of the chromatograph. Their separation may be excellent and easy when they are highly immiscible.

This is in particular the case of water and aliphatic, naphthenic, and aromatic hydrocarbons, natural and synthetic oils, many organic and natural substances. The separation is then achieved in an extremely simplified manner in a very low-cost decantation flask, for example.

To the process a simple purification step can be added for the condensed, decanted and separated carrier gas such as a vapor removal, a distillation, a liquid-liquid extraction, a flash, a decantation, a membrane separation (such as pervaporation, reverse osmose, nanofiltration), etc.

In particular when this purification will be made by distillation by the vapor of the condensed carrier fluid, the necessary vapor can be produced by recovering the power given up to the carrier gas by the compressor. This translates to overheating and therefore appreciable heat that may be recovered to evaporate from the carrier fluid in liquid form.

According to a variant of this process, a MVR heat pump cycle can be realized around this distillation column. Advantageously this loop around the column and the carrier fluid loop around the chromatograph will use the same compressor.

To the process a simple purification step can be added for the load condensed and separated such as a distillation, a vapor distillation, a liquid-liquid extraction, a flash, a membrane separation (pervaporation, osmose inverse, etc.) to separate it from the last traces of carrier fluid.

These traces of carrier fluid will advantageously be recovered and recycled. Advantageously as carrier gas water vapor optionally overheated with non-polar or only slightly polar organic loads, or aliphatic hydrocarbons optionally overheated with the polar loads or containing hydrogen bonds are chosen as carrier gas. The aliphatic hydrocarbons chosen will preferably be linear.

Advantageously the product from the load from the separation will have a higher boiling point than the carrier gas, preferably at least more than 40° C. above it, to make the boiling temperature of the binary azeotrope of the product and carrier fluid close to that of the pure carrier fluid.

The process loop can be completed by recovering the energy from a non-condensed fluid from condensers to evaporate the load. This can be the subject of a second MVR loop.

Note that a preferred feature of the invention consists in combining and selecting a multicapillary packing and an annular continuous chromatograph to conduct the chromatographic separation, and of a carrier gas condensable and immiscible with the load in liquid state, and their separation by decantation after condensation, coupled with an energy optimization by mechanical vapor recompression around the production of the carrier gas. This selection produces a highly effective chromatographic process with low energy cost.

The carrier gas in the chromatograph can operate at any temperature required by the boiling points of the species present. In cases where this temperature is much higher than the condensation temperature of the carrier gas an injection of liquid carrier fluid at the exit of the chromatograph and upstream of the condensers, or desuperheated, can help to reduce the heat exchange surface area required downstream. Alternatively an economizer can be implemented in the form of a sensitive heat exchanger between the chromatograph's entry and exit flows.

The process loop turning carrier fluid can operate at any pressure required by the requirements of the process.

FIG. 1 shows an example of a process according to the invention with a carrier liquid serving as a refrigerant fluid. The chromatograph is fed by the liquid load 1 and the liquid carrier fluid 2. Effluent liquids 3, 4 enter through control valves 9 controlled by the pressure downstream in one side of the heat exchangers 8 or they vaporize. The partially vaporized fluids are decanted in three phase flasks 7. The light liquid phase is for example product 13. Vapor 12 is compressed in compressor 5 and returns towards the other side of exchangers 8. The compressed vapor phase is condensed under pressure in the exchangers 8 serving for vaporization of chromatographic fractions 3 and 4 to improve the energy efficiency of the process by mechanical vapor recompression (MVR). Pump 10 carries the condensed carrier fluid to the chromatograph. Reference 14 is a carrier liquid complement. Note that device 5 called compressor in this text can be an equipment that can increase the pressure of a gaseous fluid process, such as for instance a rotating, alternating compressor, an axial booster, one or more ventilators, an ejector. It goes without saying that extra purifications of the various combined saturated phases can be added to the flow diagram. The process can be controlled as briefly described in the Figure, where PIC means Pressure Indication and Control, PDIC means Pressure Differential Indication and Control, and LIC means Level Indication and Control.

Figure 2:
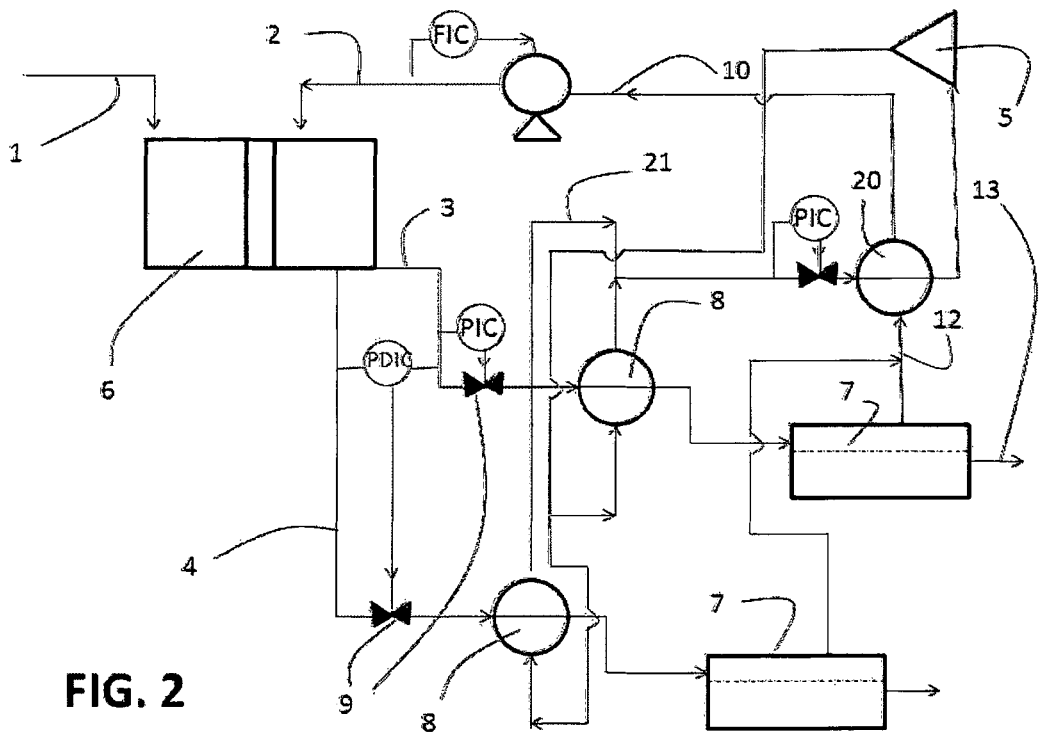
FIG. 2 is a drawing of a process according to the invention using a continuous liquid phase chromatograph characterized in that the refrigerant fluid loop is outside the process flow

FIG. 2 shows an example of the process according to the invention with a heat pump outside the process flow. The chromatograph is fed by the liquid load 1 and the liquid carrier fluid 2. Effluent liquids 3, 4 enter through control valves 9 controlled by the pressure downstream in one side of the indirect contact heat exchangers 8 or they vaporize by condensing a refrigerant fluid 21. The partially vaporized fluids are decanted in flasks 7. The liquid phase is for example product 13. Vapor 12 is condensed in exchanger 20 to cause boiling of the refrigerant fluid negatively pressurized by compressor 5 and it returns to the chromatograph. The pump carries the condensed carrier fluid to the chromatograph. The vaporized refrigerant fluid returns to exchangers 8. Note that the carrier fluid works in such a process at a temperature less than the temperatures that it is subject to in the loop of the example where it is compressed in compressor 5. Note that the control of a complex process loop having several chromatographic fractions is independent from the fluid circuit of the process side making its operation simpler and more effective.

Figure 3:
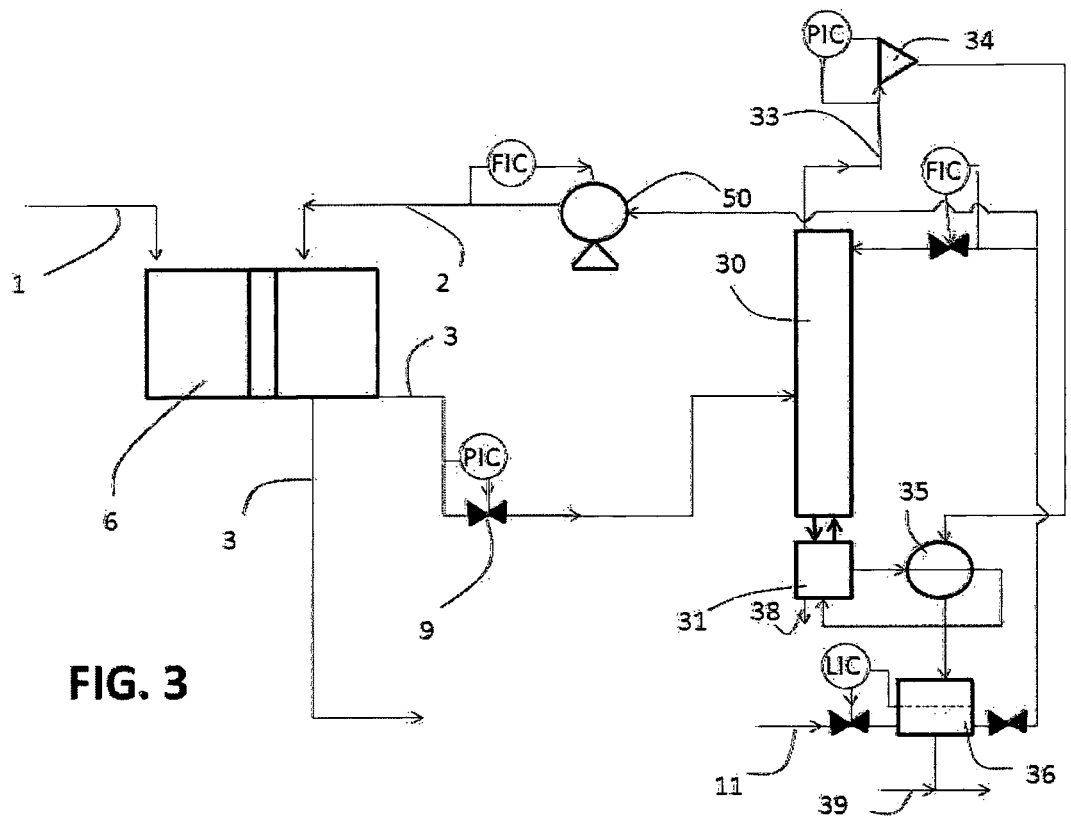
FIG. 3 is a drawing of a process according to the invention using a continuous liquid phase chromatograph characterized in that the carrier fluid is purified in a distillation column having a MVR loop

FIG. 3 shows a process scheme for which the carrier liquid is added at the exit of chromatograph 6 in a distillation column 30 and separated from one or more components of load 1. The column includes a reboiler 31,35, a condenser 35 and a reflux flask 36. The reboiler and the condenser are coupled. The liquid carrier fluid is evaporated in one side of reboiler 35 and the gaseous process flow coming from the column head under pressure is condensed by compressor 34 to evaporate the load on the other side of reboiler 35. Reference 33 is the vapor flow at the head of the column. Condensed and purified carrier fluid 2 returns to the chromatograph via pump 50. The concentrated and purified load is recovered at the foot of column 38.

Figure 4:
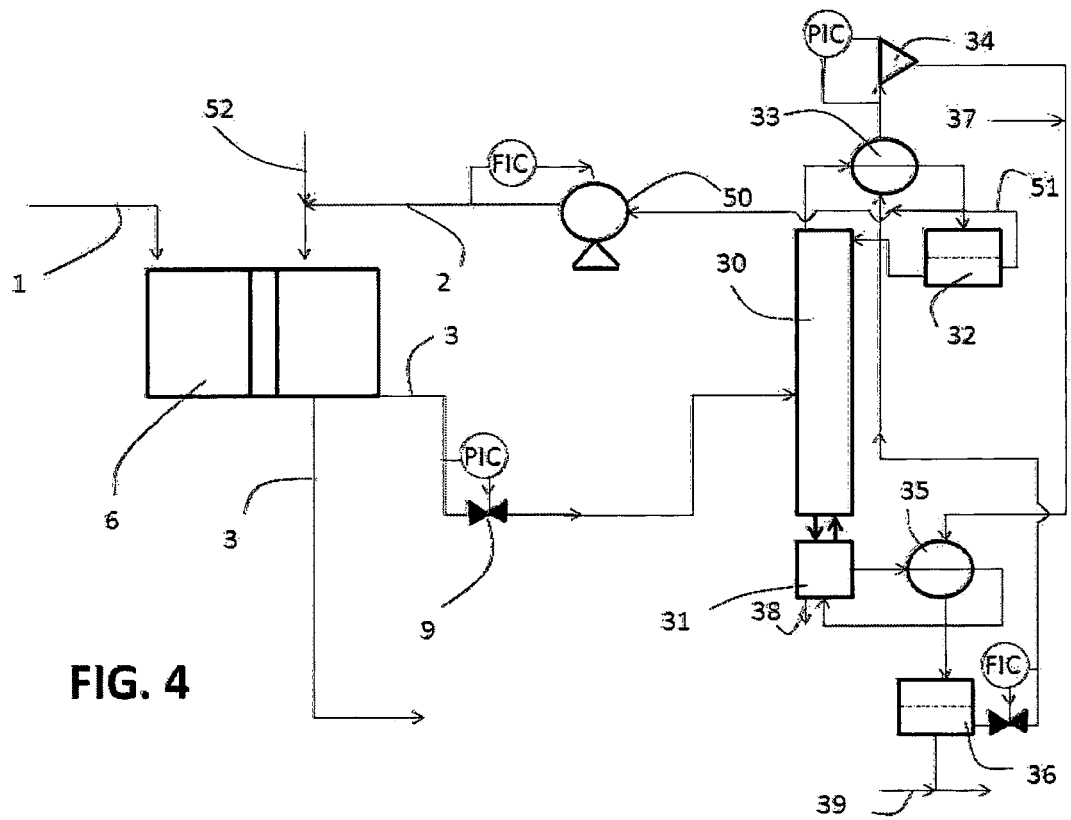
FIG. 4 is a drawing of a process according to the invention using a continuous liquid phase chromatograph characterized in that the carrier fluid is purified in a distillation column including a MVR loop outside the process flow

FIG. 4 shows a process scheme for which the carrier liquid is added at the exit of chromatograph 6 in a distillation column 30 and separated from one or more components of load 1. The column includes a reboiler 31,35, a condenser 33 and a reflux flask 32. The reboiler and the condenser are coupled by a heat pump using a refrigerant fluid loop 37. The liquid carrier fluid is evaporated on one side of reboiler 35 by condensing the gaseous refrigerant fluid 37 pressurized in compressor 34 and the gaseous process flow coming from the column head is condensed by evaporating the liquid refrigerant fluid depressurized from suction from compressor 34. Condensed and purified carrier fluid 2 returns to the chromatograph via pump 50. The concentrated and purified load is recovered at the foot of column 38.

Figure 5:
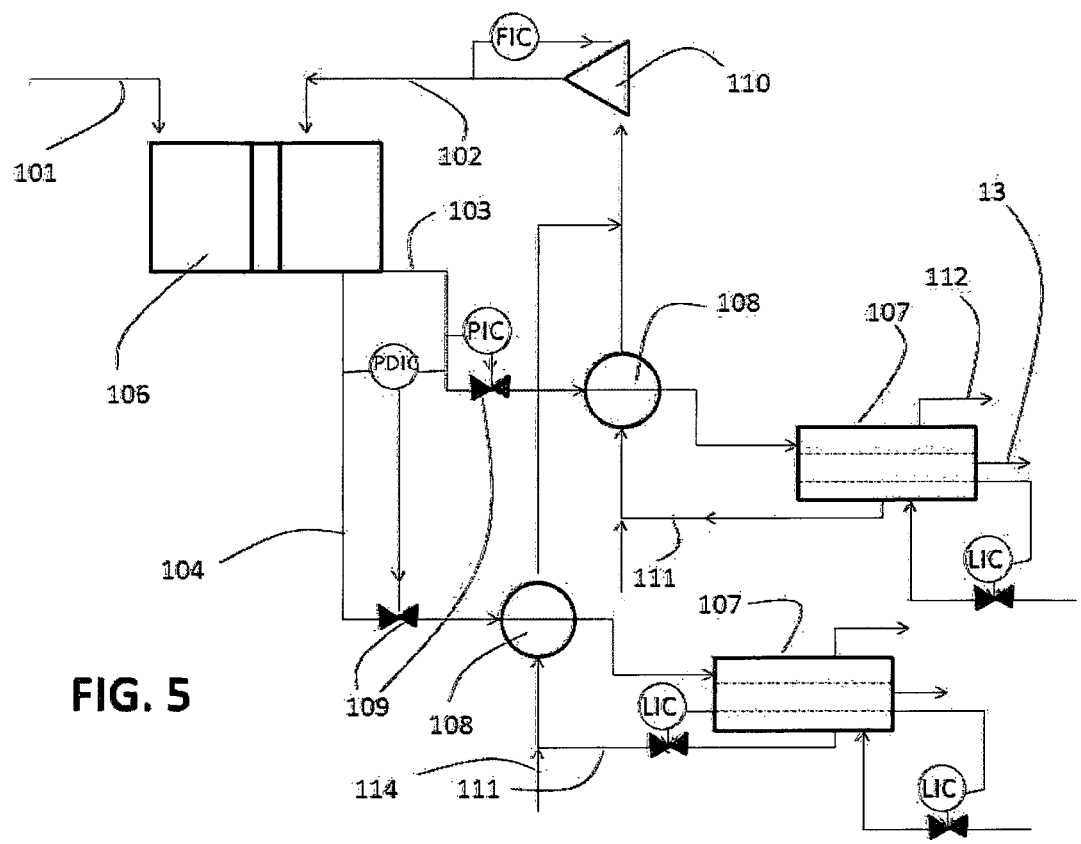
FIG. 5 shows an example of the process according to the invention with a carrier gas that can be condensed and serving as a refrigerant fluid.

FIG. 5 shows an example of the process according to the invention with a carrier gas that can be condensed and serving as a refrigerant fluid. The fluids are such that the liquid load is immiscible with the condensed carrier gas in the liquid state. The chromatograph is fed by vaporized load 101 and carrier gas 102. Gaseous effluents 103,104 enter through control valves 109 controlled by the pressure downstream in one side of the heat exchangers 108 or they condense. The partially condensed vapors are decanted in three phase flasks 107. The light liquid phase is for example product 113. Heavy phase 111 is for example the condensed carrier gas. Non-condensed vapor 112 is sent to the downstream process. Heavy phase 111 is evaporated under reduced pressure in exchangers 108 serving for condensation of chromatographic fractions 104 and 105 to improve the energy efficiency of the process by mechanical vapor recompression (MVR). Compressor 110 achieves this negative pressurization and overcomes the loss of load of the chromatograph, control valves and heat exchangers. Note that device 110 called compressor in this text can be an equipment that can increase the pressure of a gaseous fluid process, such as for instance a rotating, alternating compressor, an axial booster, one or more ventilators, an ejector. Note that the energy contained in vapor flow 112 may be used to advantage to vaporize load 101 using another MVR. The energy source of the process then becomes entirely electric. Flow 114 is a possible complement for the heavy phase. It goes without saying that extra purifications of the various combined saturated phases can be added to the flow diagram. The process can be controlled as briefly described in the Figure, where PIC means Pressure Indication and Control, PDIC means Pressure Differential Indication and Control, and LIC means Level Indication and Control.

Note that in a single energy optimization center a heat pump can be integrated on different process fractions concentrated in either simple flash flasks, or in distillation columns. This center can run on the basis of a single compressor.

The structures and devices described in this text could be used in all the domains of the chemical, oil, nuclear and pharmaceutical industries.

EXAMPLE

The table below exemplifies the use of various refrigerant fluids to recover energy by MVR during the concentration of an effluent from a chromatographic process using as carrier fluid a mixture of heptane (60% by weight) and ethanol (40% by weight).

| Refrigerant fluid | Relative productivity | Compressor power per product (relative %) |
| --- | --- | --- |
| Heptane60Ethanol40 | 1 | 100 |
| $CH_2Cl_2$ | 3.79 | 108.08 |
| $CHCl_3$ | 1.65 | 91.74 |

For an energy recovery installation with the identical sizing (volumic capacity of the compressors and heat exchange surface areas), the use of the process solvent as refrigerant fluid leads to mediocre productivity, 3.8 times lower than that produced by substituting it with dichloromethane, and 1.65 times lower than that produced by chloroform.

This performance should be compared with the compression power necessary per mass unit of product manufactured and therefore the electric energy consumed, 10% less by using chloroform as refrigerant fluid.

The final choice takes into account the inflammability and toxicity characteristics as a function of process needs, dichloromethane being non-inflammable and non-toxic, chloroform being non-inflammable and more toxic but higher performing. Dichloromethane will be chosen for food applications, chloroform for specialty chemistry applications for example.

The following table shows the number of effects accessible as a function of the maximum compression rate in the refrigerant loop for dichloromethane.

| Compression rate | Number of effects | Exchanger surface areas (index 1 for a compression rate of 3.0) |
| --- | --- | --- |
| 1.3 | 16.99 | 10 |
| 1.5 | 11.08 | 5 |
| 3.0 | 3.95 | 1 |

11 effects are accessible with a compression rate of 1.5, performance inaccessible by a classic multiple effect without mechanical vapor recompression.

The number of effects is the ratio between the energy consumption of the process necessary to evaporate the liquid carrier fluid and the quantity of latent energy of vaporization necessary to evaporate the liquid carrier fluid

What is claimed is:

1. A liquid, gas or supercritical chromatography process, wherein, on a chromatograph (6) containing a stationary phase, a load (1) comprising components to be separated brought by a carrier fluid (2) is circulated, said process being characterized in that:
    (a) at an exit of the chromatograph, a plurality of chromatographic fractions (3, 4) are obtained, wherein the plurality of chromatographic fractions (3, 4) comprise at least one component of the load and the carrier fluid in a first fluid phase,
    (b) a change of state is imposed on at least a portion of the carrier fluid in the first fluid phase of at least one of said plurality of chromatographic fractions (3, 4) so as to obtain a subset of at least one fraction of the carrier fluid, purified in a second fluid phase different from the first fluid phase and separating the carrier fluid from the at least one component of the load,
    (c) another change of state, the inverse of that of step (b) is imposed on the carrier fluid obtained in step (b) so as to obtain the subset of the at least one fraction of the carrier fluid in a third fluid phase different than the second fluid phase, and in that a change of state energies from the first fluid phase to the second fluid phase and from the second fluid phase to the third fluid phase from the subset of the at least one fraction of the carrier fluid or another subset of the at least one fraction of the carrier fluid are coupled, said coupling comprising a heat transfer using a heat pump to implement liquid evaporation or vapor recompression of a refrigerant fluid different than the carrier fluid, in a flow of refrigerant fluid external to the chromatography process.

2. The process according to claim 1, wherein the first fluid phase is liquid, wherein the second fluid phase is gaseous, wherein the third fluid phase is liquid, wherein the plurality of chromatographic fractions (3, 4) obtained at the exit of the chromatograph comprise the at least one component of the load and the carrier fluid in a liquid state, and wherein:
 in the step (b), at least one of said plurality of chromatographic fractions is vaporized to obtain said at least one component of the load in a concentrated liquid state and the carrier fluid in a vapor state,
 in the step (c), said carrier fluid obtained in the step (b) is condensed, and
 a portion of energy of a condensation of the carrier fluid is recovered and used to provide another portion of the energy necessary to vaporize the carrier fluid of at least one of the plurality of chromatographic fractions.

3. The process according to claim 1, wherein the first fluid phase is gaseous, wherein the second fluid phase is liquid, wherein the third fluid phase is gaseous, wherein the plurality of chromatographic fractions obtained at the exit of the chromatograph each comprise the at least one component of the load and the carrier fluid in a gaseous state, and wherein:
 in the step (b), at least one of said plurality of chromatographic fractions is condensed so as to separate the at least one component of the load and the carrier fluid,
 in the step (c), the carrier fluid obtained in the step (b) is vaporized and said carrier fluid is added in the gaseous state to the chromatograph, and
 a portion of energy released by a condensation of said at least one of the plurality of chromatographic fractions is used to provide another portion of the energy necessary for a vaporization of the carrier fluid.

4. The process according to claim 1, wherein the first fluid phase is supercritical, wherein the second fluid phase is liquid, wherein the third fluid phase is gaseous or supercritical, wherein the plurality of chromatographic fractions obtained at the exit of the chromatograph each comprise the at least one component of the load and the carrier fluid in a supercritical state, and wherein:
 in the step (b), at least one of said plurality of chromatographic fractions is condensed to separate the at least one component of the load and the carrier fluid,
 in the step (c), the carrier fluid obtained in the step (b) is vaporized and said carrier fluid is added in the supercritical state to the chromatograph, and
 a portion of energy released by a condensation of said at least one of the plurality of chromatographic fractions is used to provide another portion of the energy necessary for a vaporization of the carrier fluid.

5. The process according to claim 1, wherein the at least one component of the load and at least one part of the carrier fluid are condensable simultaneously in substantially immiscible liquids that are separable by decantation in conditions of the process.

6. The process according to claim 1, wherein the vapor recompression is conducted by an ejector.

7. The process according to claim 1, wherein the vapor recompression is conducted by mechanical vapor recompression.

8. The process according to claim 1, wherein the vapor recompression is implemented by at least one compressor whose compression ratio is less than 3.

* * * * *